Feb. 16, 1971 C. H. ROSENBAUER 3,563,057
METHOD FOR MAKING MULTIFOCAL LENS
Original Filed Jan. 3, 1966

CHARLES H. ROSENBAUER
INVENTOR.

BY Lowell J. Wise

AGENT

United States Patent Office 3,563,057
Patented Feb. 16, 1971

3,563,057
METHOD FOR MAKING MULTIFOCAL LENS
Charles H. Rosenbauer, Irondequoit, N.Y., assignor to Bausch & Lomb Incorporated, Rochester, N.Y., a corporation of New York
Continuation of application Ser. No. 518,272, Jan. 3, 1966. This application Aug. 28, 1968, Ser. No. 757,220
Int. Cl. C03b 15/00, 11/08
U.S. Cl. 65—30        2 Claims

ABSTRACT OF THE DISCLOSURE

A method of making a multi-focus lens. Selected ions (silver or thallium) are diffused through the surfaces of a recess into a glass blank having the same index of refraction as the base element of the lens. The diffused ions form a zone of gradient refractive index adjacent to the surfaces of the recess. A segment glass of higher refractive index than the initial blank is then fused in the recess to form a composite disc. The portion of the blank beneath the recess is removed to expose the segment glass. The composite disc is then shaped to the required curvature and fused to the base element.

BRIEF DESCRIPTION

This application is a continuation of application Ser. No. 518,272, filed Jan. 3, 1966 now abandoned.

This invention relates to multifocal lenses and provides a method for diffusing material into an optical material for the purpose of changing the refractive index. In particular this invention provides a novel method for joining two or more optical materials having different refractive indices whereby a zone containing a refractive index gradient is provided between materials having different indices.

In the manufacture of ophthalmic lenses it has been found desirable to include a lens area having a higher index glass than the principal piece of the lens. This has proven to be a highly successful method for compensating for focal lengths in the ophthalmic field and is widely used in the manufacture of bifocal and trifocal spectacles. Most multifocal lenses at the present time have a fused interface which appears as a distinct line at the interface between the high and low index glass lens media. This line is often distracting to the wearer of spectacles and various means have been devised for reducing the linear break. The fused interface between high and low index glass presents a reflecting surface which produces annoying reflections to the spectacle wearer because the interface is a plane which is transverse to the plane of the lens, and the interface is located near the pupil of the wearer during use. Attempts to reduce the interface reflection include treating the edges of the glass prior to fusion, but this is not satisfactory because of discoloration of the treated portion.

It has been discovered that this line may be substantially eliminated by altering the refractive index of the optical lens medium at the interface between the high and low index media. This may be achieved by a diffusion process in which a thermal diffusant, such as metal ions in the case of glass optical material, may be contacted with one or more of the optical materials and in which diffusant material migrates for a predetermined distance into the optical material, thus changing the refractive index and providing a gradient between lens areas of fixed refractive index. This is accomplished without the necessity of providing for an intermediate lens curve.

Accordingly it is an object of this invention to provide an ophthalmic lens having an even transition between high and low index optical materials.

It is a further object of this invention to provide a method for partially transporting a refractive index-changing diffusant into the body of a lens material such as glass.

In particular, it is an object of this invention to diffuse metal ions, such as silver, or thallium into a low index lens medium such as silicate glass to increase the refractive index of the glass evenly from the middle of the glass body toward the surface of the treated glass and thereafter to fuse a higher index glass onto the surface of the treated crown glass. These and other objects and features of the invention will be seen in the following description and drawing in which, FIG. 1 is a vertical cross section view of a low index glass being treated by the method of this invention.

In making multifocal lenses for ophthalmic purposes different dioptric powers for different vision fields are provided by making composite sub-assemblies by fusing pieces of glass or other optical lens media having different refractive indices. A composite sub-assembly is ground and polished on one side and fused into a polished countersink in a major member of glass as shown in U.S. Pat. 2,963,823, Dec. 13, 1960 and U.S. Pat. 2,280,322, Apr. 21, 1942. The ophthalmic lenses manufactured by the prior art methods of which these patents are typical have a distinct and visible line between the focal areas of the lenses. By the method of this invention this line may be eliminated by providing a gradual index change from the lower refractive index of the major member of glass to the higher refractive index of the segment portion of the lens.

Figure 1:
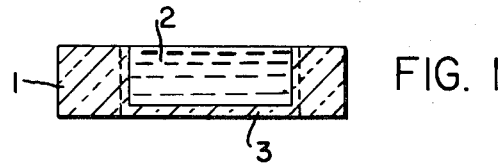

Referring to the drawing, FIG. 1 shows a low index crown glass first lens portion 1 in the shape of a "button," having a segment-shaped recess 2 formed therein and a bottom portion 3 of the same low index crown glass forming a recess well.

Figure 2:
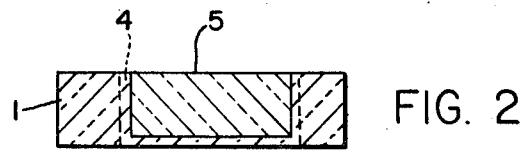
FIG. 2 is a cross sectional view of a low index glass having a high index glass inserted therein.

The shape of the recess 2 is not critical and it may be cut into the first lens portion 1 by known methods using a diamond drill or by casting. Prior to the diffusing treatment the surface to be in contact with the diffusing treatment be throughly cleaned to assure uniform transport conditions for diffusant material migrating across the surface interface and into the body of the lens. The well 2 is filled with a diffusant and is heated to a temperature sufficient to permit migration of material from the diffusant into the body of the first lens portion 1. The diffusant is conveniently silver chloride or other metal salts or compounds capable of changing the refractive index of the first lens portion 1. The penetration of silver into the surfaces adjacent recess 2 is about 2 mm. As shown in FIG. 2, a diffused zone 4 is formed during the heating process. Excess diffusant and back-migrating material from the first lens portion is removed mechanically from the recess or dissolved by a suitable solvent and the recess is cleaned. A segment-shaped second lens portion 5 is inserted into the first lens portion 1 and fused thereto. Lens portion 5 is a higher index glass, such as barium crown. The surface of the treated glass at recess 2 ideally will have the same higher refractive index as the segment shaped second lens portion.

Figure 3:
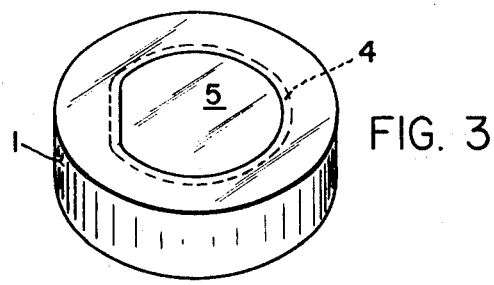
FIG. 3 is a perspective view of the treated glass of FIG. 2.
Figure 4:
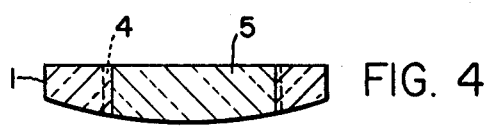
FIG. 4 is a vertical cross section view of an assembled high and low index glass composite having a ground and polished surface formed thereon and, FIG. 5 is a cross section view of a completed ophthalmic blank produced by the method of this invention.
Figure 5:
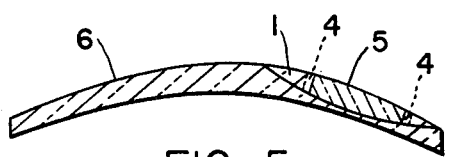

FIG. 3 shows the completed composite sub-assembly in perspective. The composite is then ground and polished as shown in FIG. 4 to provide a matching surface for fusion of the composite to form a lens blank in which a major piece 6, as shown in FIG. 5, has a countersunk portion into which the composite sub-assembly is fused. After fusion of the composite and major lens piece, the fused ophthalmic blank is ground and polished to produce the lens shown in FIG. 5. Ordinarly the optical lens medium of the major piece 6 will be the same as the low-index silicate glass for the first lens portion 1. Thus, fusion of the composite and major piece shown in FIG. 5 provides a continuous field ophthalmic blank in which the refractive index from the body of the major piece to the segment-shaped second lens portion 5 is a smooth transition through zone 4 containing diffusant material. The example shown is a bifocal lens; however, trifocal or other multifocal lenses may be manufactured by this process. The methods for fusing the various materials used herein are known to the art and do not form an essential part of this invention.

While the embodiment described herein is directed toward the use of metal ions as a diffusant material for changing the refractive index of glass, other optical materials, such as plastics, may be treated by similar process using a suitable diffusant for altering a refractive index. Also while this process has been shown as increasing the refractive index by choice of suitable diffusant the higher index material may be lowered by diffusion within the inventive concept.

In order to obtain a high quality lens product it is necessary to follow careful design procedures in the fabrication and diffusion steps for the lenses. Silicate glass is the preferred lens medium for the first lens portion 1 and the major lens piece 6. Ordinary crown glass (refractive index=1.523) may be altered using silver ions in the diffusant. The change in refractive index ($\Delta n_D$) for silicate glasses by diffusion of silver is on the order of 0.025.

The depth of penetration for various silicate glasses is as high as 7 mm. using thermal diffusion from a molten silver chloride diffusant at a temperature of 500 to 600° C. The heating may be carried out in an ordinary furnace using ambient atmosphere for 1 to 72 hours. Metal compounds using silver, copper, thallium, zinc or other cations and chloride, bromide, iodide, nitrate, sulfate or other anions may be used. The diffusant should be chosen for the particular lens medium matrix material being altered.

Very large changes in refraction index may be achieved by using a diffusant comprising thallium ions. A low-melting diffusant containing equimolar portions of thallium chloride and zinc chloride salts may be used with silicate glasses. A diffusion treatment at about 550° C. or higher for a few hours gives an index change ($\Delta n_D$) of about 0.07, about three times the maximum for silver ions. The zinc salt is added to lower the melting point of the thallium salt and to provide intimate contact at the diffusant-lens interface.

The selection of the segment lens medium should be made carefully to provide a compatible sub-assembly. Since the ideal multifocal lens has a smooth transition for the low index major lens piece to a higher index segment lens medium, the refractive index of the segment should approximate that of the altered surface adjacent the treated recess 2. Typically, the index gradient changes from the low-index unaltered lens medium of the first lens portion 1 near the limit of penetration in zone 4 and increases to a maximum index at the surface of recess 2 where the matrix 1 contacted the diffusant. By selecting a segment lens medium having a refractive index of about that corresponding to the increased index at the surface ($n_D=1.523+.025$ (for $Ag^+$)$=1.548$) the continuous change of index from major lens piece to the segment-shape portion may be realized. Suitable segment glasses could be manufactured to match the refractive index, dispersion and thermal expansion characteristics of the ideal segment medium. Barium flint, light barium crown, light flint and other suitable glasses are commercially available for this application.

While this invention has been described by specific embodiments, there is no intent to limit the inventive concept except as set forth in the following claims.

I claim:
1. Method of producing a multifocal lens comprising:
  (a) forming a shaped recess in a first body of glass having a selected refractive index,
  (b) diffusing selected ions into the body through the surfaces thereof bounding the recess to form a zone of substantial thickness in the body adjacent to the surfaces of the recess in which the refractive index differs in gradient fashion from the initial refractive index of the body, the difference being greatest at the surfaces of the recess,
  (c) inserting in the recess a second glass body having an index of refraction approximately equal to the index of refraction of the first body at the surfaces of the recess, and fusing the second body to the first one,
  (d) cutting away a portion of the first body opposite from the open end of the recess to expose a second major surface of the second body thereby to produce a composite glass disc having an annular outer portion of the selected refractive index, an inner core portion of a uniform refractive index different from the selected index, and an intermediate annular portion constituting a zone of gradient refractive index, and
  (e) fusing the composite disc so formed to a base lens element of the selected refractive index.

2. Method according to claim 1 wherein the first body and the base lense element are of silicate glass, the selected ions serve to increase the refractive index of the glass, and the second body is of a glass having a higher index of refraction than the first body.

References Cited

UNITED STATES PATENTS

| | | | |
|---|---|---|---|
| 1,996,442 | 4/1935 | Stanley | 65—37 |
| 2,035,827 | 3/1936 | Newell | 65—38 |
| 2,053,551 | 9/1936 | Culver et al. | 65—38 |
| 2,344,250 | 3/1944 | Jones | 65—30X |
| 2,388,687 | 11/1945 | Hammon | 65—38 |
| 2,963,823 | 12/1960 | Ohliger | 65—38 |
| 3,320,114 | 5/1967 | Schulz | 65—60X |

FRANK W. MIGA, Primary Examiner

U.S. Cl. X.R.

65—36, 37, 38, 39; 350—75